United States Patent [19]

D'Aiello, Jr.

[11] Patent Number: 4,673,576

[45] Date of Patent: Jun. 16, 1987

[54] METHOD OF PRODUCING VEAL AND ANIMAL FEED THEREFOR

[75] Inventor: Frank J. D'Aiello, Jr., Circleville, Ohio

[73] Assignee: The Ohio Grain Company, Milford Center, Ohio

[21] Appl. No.: 731,409

[22] Filed: May 7, 1985

[51] Int. Cl.$^4$ ................................................ A23K 1/00
[52] U.S. Cl. ........................................ 426/2; 426/74; 426/623; 426/630; 426/807
[58] Field of Search ..................... 426/2, 72, 74, 623, 426/630, 635, 807

[56] References Cited

U.S. PATENT DOCUMENTS

| | | | |
|---|---|---|---|
| 3,244,527 | 4/1966 | Baker | 426/74 |
| 4,132,808 | 1/1979 | Kakade | 426/74 |
| 4,216,236 | 8/1980 | Mueller et al. | 426/74 |
| 4,414,238 | 11/1983 | Schmidl | 426/74 |
| 4,447,254 | 5/1984 | Hughes et al. | 426/74 |

FOREIGN PATENT DOCUMENTS 990869  5/1965  United Kingdom ................. 426/74

OTHER PUBLICATIONS

Morrison "Feeds & Feeding" Morrison Publishing Co 1957 pp. 104–107, 762–763 & 1114–1121.
Elvehjem et al "The Copper Content of Feedstuffs, J. of Biolog. Chems., vol. 82, (1929), pp. 473–477.
Hart et al "Copper as a Supplement to Iron for Hemoglobus Building in the Rat" J. Biol. Chem May 1928 pp. 797–812.
Brenner et al "Iron Metabolism in the Veal Calf" British J. of Nutrition 1973 vol. 30 pp. 61–76.

Primary Examiner—R. B. Penland
Attorney, Agent, or Firm—Vorys, Sater, Seymour & Pease

[57] ABSTRACT

Light-colored veal very similar to milk-fed veal can be produced by feeding calves a special ration which is high in protein and unsaturated fat, low in carbohydrate, and low in available copper.

The ration comprises protein in an amount of about 14% to about 20% by weight, optionally with the addition of certain amino acids; fat in the amount of about 7% to about 12% by weight and carbohydrate not to exceed about 60% by weight. The proportion of available copper in the ration should not exceed about 20 milligrams/pound of feed. The balance of the ration comprises the conventional ingredients fiber, ash, moisture, minerals and trace elements.

The veal is produced by feeding the calves substantially exclusively the ration of the invention from the time of weaning until they are ready for slaughter, generally at a weight of about 500 pounds and an age of about 23 weeks.

19 Claims, No Drawings

METHOD OF PRODUCING VEAL AND ANIMAL FEED THEREFOR

BACKGROUND OF THE INVENTION

1. Field of the Invention

This invention relates to method of feeding calves to produce veal and to feed rations used in such methods.

2. Brief Description of the Prior Art

The light-colored meat of calves, particularly that of calves fed exclusively on milk, has long been considered a delicacy. The conventional procedure for producing high quality veal is to feed calves exclusively on milk or a milk replacer equivalent to whole milk, not weaning them and denying them access to the usual feed which is provided to growing animals such as hay and the like. In particular, dietary intake of iron is restricted, so much so that in some cases special measures are taken to remove iron from the water the animals are given to drink. The calves are often kept under conditions of very low light which has also been found to favor the formation of desirable light-colored meat. This regimen causes the meat of the calf to have the characteristic light color of veal, rather than the red color associated with the normal flesh of a mature animal, due to the absence from the muscle tissue of the iron-containing protein myoglobin. However, the severe restriction of iron also results in poor formation of hemoglobin, the oxygen-carrying protein of the blood, which also requires iron for its formation. As a result, calves fed exclusively on milk beyond the normal weaning time tend to be anemic and are often in poor health. This situation requires great care in the treatment of the animals, and has even come to be considered a somewhat cruel treatment. Because of the expense of a milk diet and the extra care required to produce milk-fed veal, this meat is very expensive, and is generally used in special dishes and is consumed in relatively small quantities. Clearly, if a simpler and less expensive method for producing light-colored veal were known, this food would be more available to the consumer.

Hence a need has continued to exist for a less critical and less expensive method of producing high quality light-colored veal.

SUMMARY OF THE INVENTION

It has now been found that light-colored veal very similar to milk-fed veal can be produced by feeding calves a special ration which is high in protein and fat, low in carbohydrate, and low in copper.

The ration of the invention comprises protein in an amount of about 14% to about 20% by weight, optionally with the addition of certain amino acids; fat in the amount of about 7% to about 12% by weight. The proportion of carbohydrate should not exceed about 55% by weight. The proportion of available copper in the ration should not exceed about 20 milligrams/pound of feed. The balance of the ration comprises the conventional ingredients fiber, ash, moisture, minerals and trace elments.

The veal is produced by weaning the calves at the usual time, beginning at an age of about 10 days, by feeding the ration of this invention until the animals are ready for slaughter, generally at a weight of about 500 pounds and an age of about 23 weeks.

DETAILED DESCRIPTION OF THE INVENTION AND PREFERRED EMBODIMENTS

The protein component of the calf ration of this invention may range from about 14% to about 20% by weight. When the feed contains less than about 14% by weight of protein, the calves will generally not gain weight, while when the proportion of protein is greater than about 20% by weight, the animals are prone to digestive upset and may not gain at rates comparable to those fed with slightly lower proportions of protein. A preferred amount of protein is 18% to 20% by weight. The protein in the ration may be supplemented by added amino acids, particularly lysine and methionine. These amino acids may be added in amounts up to an equivalent of about 24% protein by weight. The added amino acids are especially useful when the proportion of protein is slightly lower than the maximum, e. g., when the protein proportion is about 18% by weight.

The protein may be obtained from any conventional source of protein for animal feed. It is preferred to obtain the protein portion of the ration from vegetable protein such as defatted soybean meal, soybean millfeed (hulls and germ of soybeans), distillers grains and corn solubles and the like. For best digestibility the soybean millfeed should be toasted at a temperature of about 340° F. for a period of about 1 minute.

The calf ration of this invention should have a relatively high proportion of fat and the fat should preferably be relatively unsaturated. It has been found that when saturated fats are used in a ration otherwise similar to the ration of this invention, the animals do not gain weight as rapidly as when fed the ration of this invention. Accordingly, the fat component of the ration is preferably derived from vegetable fats which are relatively high in unsaturated fats. Such sources of fat include corn, soybeans, and the like. The total proportion of fat in the ration of this invention should range from about 6% to about 12% by weight. A preferred proportion of fat is about 8% by weight. A preferred source of fat is high fat hominy feed. This material comprises the hulls and germ of corn and is a typical by-product of corn wet milling. The hominy feed as it is prepared contains a relatively high percentage of fat, typically about 10–12% by weight. Some producers extract the fat component for separate sale, yielding a relatively low fat hominy feed. In the process of this invention it is preferred to use the high fat hominy feed as a source of the fat component because the corn oil has a relatively high degree of unsaturation.

Because unsaturated fats are prone to oxidation, it is preferred to incorporate a relatively high proportion of Vitamin E into the ration of this invention in order to act as an antioxidant. It will be recognized by those skilled in the art that the amount of Vitamin E to be added will depend on the amount of fat in the feed and the degree of unsaturation. In general, the amount of Vitamin E should be greater than about 6 International Units (IU) per pound of feed. Preferably the amount of Vitamin E is about 7 IU/lb and it may range as high as 9 or 10 IU/lb.

The carbohydrates in the ration provide the greatest portion of the energy to the growing animal. These can be provided from any conventional source of carbohydrates used in animal feed. Most vegetable feeds will contain a substantial portion of carbohydrate. For example, many of the vegetable materials which are added to the ration of this invention to supply protein and/or fats also contain substantial proportions of carbohydrates which will make up a part of the carbohydrate portion of the ration. Other vegetable materials, such as cane sugar molasses, supply carbohydrate almost exclusively. The amount of carbohydrate in the feed of this invention will typically range from about 35% by weight to about 55% by weight. A preferred proportion of carbohydrate is about 45% by weight.

The relative amounts of the various vegetable sources used in formulating the feed are not critical, provided only that the ultimate proportions of proteins, unsaturated fats and carbohydrates are according to the defined proportions of the invention.

It is critical to the method and ration of this invention that the amount of available copper in the calves' be kept low. The amount of copper should not exceed about 20 mg/lb of feed. Although applicant does not wish to be bound by theory, it is believed that copper is necessary for iron use in formation of red muscle. Accordingly, if the amount of copper in the animal diet is restricted, sufficient iron can be given to the animals to avoid anemia and weakness, without causing formation of red muscle tissue. Thus, the extreme restriction on iron intake necessary for the production of milk-fed veal is not necessary in the method of this invention. This avoids the trouble and expense of controlling iron intake and at the same time keeps the animals in good health and allows them to grow essentially normally. The copper limitation requirement is ordinarily met by selecting the vegetable ingredients having a low proportion of copper for the feed of this invention while not adding any additional copper to the feed. A preferred upper limit for the copper content is about 15 mg/lb of feed, a more preferred upper limit is about 10 mg/lb of feed and a still more preferred upper limit is about 5 mg/lb of feed. Alternatively, feeds having higher amounts of copper may be used, provided that this copper is unavailable to the nutritional requirements of the animal. For example, it is known that amounts of molybdenum greater than about 2.7 mg/lb interfere with the action of copper and, accordingly, amounts of copper greater than 20 mg/lb can be included in the feed, provided that the amount of molybdenum is controlled so that the excess copper is without metabolic effect. It is also known that certain compounds such as penicillamine are chelators for copper and make it unavailable to the animal. Therefore such chelators and the like may be incorporated into the feed in amounts which limit the amount of available copper to levels in accordance with the invention.

The remaining ingredients of the feed are conventional. For example it is desirable to add sufficient amounts of Vitamins A and D to the ration to insure that the animals receive enough of these essential substances. The feed of the invention will typically contain 3,000 IU/lb or more of Vitamin A and 1,000 IU/lb or more of Vitamin D; although the skilled practitioner will understand that more or less of these ingredients can be used according to the needs of the animals and the requirements of economical meat production. The feed of this invention will also contain the conventional amounts of fiber, ash and moisture as natural concomitants of the vegetable ingredients. While the amounts of these ingredients are not usually controlled, if feed requirements dictate, their proportions can be adjusted to achieve a particular purpose as is known to those skilled in the art. Typically the feed of this invention will contain from 5% to 15% by weight, preferably about 10% by weight, of fiber; from about 3% by weight to about 9% by weight, preferably about 6% by weight, of ash; and from about 5% by weight to about 15% by weight, preferably about 10% by weight, of moisture.

One preferred ration of this invention will have an analysis of the essential ingredients approximately as follows, wherein the percentages are by weight, and the amount of carbohydrate is determined as is conventional, as nitrogen free extract (NFE):

| | |
|---|---|
| Protein (crude) | 17.5% |
| Fat (crude) | 8.2% |
| Carbohydrate (NFE) | 45.5% |
| Fiber (crude) | 9.8% |
| Ash | 6.2% |
| Moisture | 10.1% |
| Calcium | 0.79% |
| Phosphorus (total) | 0.71% |
| Iron | 187.1 mg/lb |
| Copper | 4.5 mg/lb |
| Vitamin A | $3.2 \times 10^3$ IU/lb |
| Vitamin D | $1.0 \times 10^3$ IU/lb |
| Vitamin E | 6.9 IU/lb |
| Digestible energy | 1400 cal/lb |

The feed also includes the conventional minor amounts of common inorganic elements and trace elements such as sodium, potassium, chlorine, magnesium, sulfur, zinc, selenium, cobalt, iodine, and the like.

As discussed above, the essential components of the feed of this invention may be derived from conventional vegetable animal feeds selected and blended according to their analysis and if necessary supplemented by added ingredients such as vitamins and trace elements.

Typical feed rations prepared from readily available vegetable ingredients are tabulated in Table 1, wherein all percentages are by weight. Each of these rations has a carbohydrate content of about 45% as calculated from the nitrogen free extractibles by the conventional procedure. It will be understood by those skilled in the art that the actual proportions of proteins, carbohydrates, fats and other components of the ingredients may vary somewhat depending on the source. Since these are natural products from plants grown under varying conditions of weather and soil, the exact composition cannot be accurately controlled. The suggested proportions are based on average values of composition for the vegetable ingredients. If it is desired to control the composition of the feed more exactly, individual lots of the vegetable ingredients can be analyzed before the feed ration is mixed, and the amounts of the ingredients can be adjusted to yield the desired analysis of the calf ration. Ordinarily close control be preliminary analysis will not be necessary except for the amount of copper. Since the amount of available copper must be controlled to achieve the results of this invention it is preferred to assure that the total amount of copper in the ingredients does not exceed the desired maximum value for copper in the ration of this invention. This control of the copper can be achieved by analyzing the amount of copper in the ingredients or by using sources known to have a controlled, preferably low, copper concentration.

In Table 1 the material referred to as "Dynamate" is a commercial mineral supplement supplying magnesium and sulfur. The Vitamin E premix contains 2000 IU/lb while the Vitamin A premix and the Vitamin D premix each contain 2000 KIU/lb (thousand International Units per pound). The trace element mix will typically be added to introduce trace elements known, either from analytical data or from previous knowledge of local soil conditions where the ingredients were grown, to be lacking in the ingredients. For example, in some regions selenium has to be added, usually in the form of sodium selenite, to compensate for lack of that element in the locally available feed ingredients.

TABLE 1

|  | 1 | 2 | 3 | 4 | 5 | 6 | 7 | 8 | 9 | 10 | 11 | 12 |
|---|---|---|---|---|---|---|---|---|---|---|---|---|
| High Fat Hominy Feed | 50.0 | 30.5 | 56.5 | 56.1 | — | 20.0 | 30.0 | 40.2 | 41.3 | 30.3 | 30.2 | 73.1 |
| Soy Hulls | — | 1.8 | — | — | — | — | — | — | — | — | — | 7.6 |
| Defatted Corn Solubles | — | 15.0 | 19.2 | 20.0 | — | 17.5 | 25.6 | 26.5 | — | — | — | — |
| Distillers Grains & Solubles | 12.0 | — | 19.0 | 17.6 | 24.0 | — | — | — | 15.0 | 20.2 | 14.2 | 11.1 |
| Distillers Grains | 15.0 | 17.9 | — | — | — | — | — | — | — | 16.0 | — | — |
| Wheat Middlings | 15.0 | 25.0 | — | — | 64.0 | 43.7 | 35.7 | — | 20.0 | 25.2 | 25.1 | — |
| Brewers Grains | — | — | — | — | — | 9.6 | — | 23.1 | 15.9 | — | 20.1 | — |
| Corn Oil | 4.3 | 6.0 | — | — | 5.8 | 6.0 | 5.4 | 6.0 | 4.3 | 4.7 | 6.0 | — |
| Limestone | 2.2 | 1.9 | 1.8 | 1.8 | 1.8 | 1.8 | 1.9 | 1.4 | 2.1 | 2.1 | 1.9 | 1.9 |
| Salt | 0.50 | 0.50 | 0.50 | 0.50 | 0.50 | 0.50 | 0.50 | 0.50 | 0.50 | 0.50 | 0.50 | 0.50 |
| Dicalcium Phosphate | 0.15 | 0.50 | — | — | — | — | — | 1.3 | — | — | 1.3 | 0.33 |
| Dynamate (Mg & S supp.) | 0.25 | 0.25 | 0.25 | 0.25 | 0.25 | 0.25 | 0.25 | 0.25 | 0.25 | 0.25 | 0.25 | 0.25 |
| Vitamin A Premix | 0.20 | 0.20 | 0.20 | 0.20 | 0.20 | 0.20 | 0.20 | 0.20 | 0.20 | 0.20 | 0.20 | 0.20 |
| Vitamin D Premix | 0.05 | 0.05 | 0.05 | 0.05 | 0.05 | 0.05 | 0.05 | 0.05 | 0.05 | 0.05 | 0.05 | 0.05 |
| Vitamin E Premix | 0.40 | 0.40 | 0.40 | 0.40 | 0.40 | 0.40 | 0.40 | 0.40 | 0.40 | 0.40 | 0.40 | 0.40 |
| Trace Mineral Mix | 0.03 | 0.03 | 0.03 | 0.03 | 0.03 | 0.03 | 0.03 | 0.03 | 0.03 | 0.03 | 0.03 | 0.03 |
| Cane Molasses | — | — | 3.0 | 3.0 | 3.0 | — | — | — | — | — | — | 4.4 |

In a feeding experiment a group of 25 Holstein calves were started at an age of 10 days on a mixture of a vegetable feed of this invention, at first mixed with a portion of buttermilk, then with reduced proportion of buttermilk until at an age of 21 days they were fed exclusively on the feed of this invention.

The composition of this feed was as follows, wherein the percentages are by weight:

| | |
|---|---|
| high fat hominy feed | 54.0% |
| distillers grains + solubles | 15.0% |
| soybean mill feed | 14.4% |
| 48% soybean meal | 7.8% |
| cane molasses | 6.0% |
| dicalcium phosphate | 1.15% |
| calcium carbonate | 1.00% |
| sodium chloride | 0.35% |
| Vitamin E premix (2000 IU/lb) | 0.30% |
| Vitamin A premix (2000 KIU/lb) | 0.15% |
| vitamin D premix (2000 KIU/lb) | 0.05% |
| sodium selenite | 0.05% |

The feed was prepared by blending the ingredients in a paddle mixer. The order of addition is not critical. In order to keep the animals from sorting and segregating the ingredients of the feed, it was then pelletized in a conventional pelletizer wherein the mixture was forced through a coarse screen by a roller.

The animals were fed for about 20 weeks after they were completely weaned, at which time they weighed about 500 pounds. The animals were then sent to the packer. The dressed carcasses averaged about 310 pounds. The meat had a light color approaching the light color of milk-fed veal and a texture equivalent to that of milk-fed veal.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. A method of producing light-colored veal comprising feeding calves a ration comprising

| | |
|---|---|
| protein | 12–20% by weight |
| carbohydrate | 35–55% by weight |
| fat | 6–12% by weight |
| available copper | 5–20 mg/lb | balance fiber, ash, moisture, minerals and trace elements.

2. The method of claim 1 wherein said protein is present in a proportion of 18–20% by weight.

3. The method of claim 1 wherein said protein is entirely vegetable protein.

4. The method of claim 1 wherein said fat is present in a proportion of about 8% by weight.

5. The method of claim 1 wherein said fat contains a substantial proportion of unsaturated fat.

6. The method of claim 1 wherein said fat is vegetable fat.

7. The method of claim 1 wherein said available copper is present in a proportion of about 15 mg/lb.

8. The method of claim 1 wherein said available copper is present in a proportion of about 10 mg/lb.

9. The method of claim 1 wherein said available copper is present in a proportion of about 5 mg/lb.

10. The method of claim 1 wherein the total amount of copper in said ration is not greater than about 20 mg/lb.

11. The method of claim 1 wherein the total amount of copper in said ration is not greater than about 15 mg/lb.

12. The method of claim 1 wherein the total amount of copper in said ration is not greater than about 10 mg/lb.

13. The method of claim 1 wherein the total amount of copper in said ration is not greater than about 5 mg/lb.

14. The method of claim 1 wherein said ration comprises conventional amounts of minerals and trace elements.

15. The method of claim 1 wherein said calves are started on said ration as soon as they are ready for weaning.

16. The method of claim 1 wherein said calves are fed substantially exclusively on said ration from the time they are completely weaned until they are slaughtered.

17. The method of claim 1 wherein said calves are fed substantially exclusively on said ration from the time they are completely weaned until an age of about 23 weeks.

18. The method of claim 1 wherein said calves are fed substantially exclusively on said ration from the time they are completely weaned until they reach a weight of about 400 to about 600 pounds.

19. The method of claim 1 wherein said calves are fed substantially exclusively on said ration from the time they are completely weaned until they reach a weight of about 500 pounds.

* * * * *